United States Patent

Aoyama et al.

[11] Patent Number: 5,808,381
[45] Date of Patent: Sep. 15, 1998

[54] LINEAR MOTOR

[75] Inventors: Hiroyuki Aoyama; Yutaka Shimizu, both of Kumagaya, Japan

[73] Assignee: Hitachi Metals, Ltd., Tokyo, Japan

[21] Appl. No.: 512,684

[22] Filed: Aug. 8, 1995

[30] Foreign Application Priority Data

Aug. 9, 1994 [JP] Japan .................................. 6-187346

[51] Int. Cl.⁶ ................................................. H02K 41/00
[52] U.S. Cl. ............................. 310/12; 310/13; 310/27; 310/194
[58] Field of Search ..................... 310/12, 194; 335/281; 336/199, 208, 233; 174/138 G

[56] References Cited

U.S. PATENT DOCUMENTS

| | | | |
|---|---|---|---|
| 4,186,322 | 1/1980 | Besson | 310/194 |
| 4,187,453 | 2/1980 | Rough | 318/135 |
| 4,758,750 | 7/1988 | Itagaki et al. | 310/13 |
| 4,764,489 | 8/1988 | Bolt | 501/96 |
| 4,831,300 | 5/1989 | Lindgren | 310/190 |
| 5,087,844 | 2/1992 | Takedomi et al. | 310/12 |
| 5,330,692 | 7/1994 | Hashimoto et al. | 264/65 |

FOREIGN PATENT DOCUMENTS

| | | |
|---|---|---|
| 61-288770 | 12/1986 | Japan . |
| 62-19075 | 2/1987 | Japan . |
| 3-222670 | 10/1991 | Japan . |
| 5-58725 | 3/1993 | Japan . |

OTHER PUBLICATIONS

CRC Materials Science and Engineering Handbook; second Edition, 1994.

*Primary Examiner*—Thomas M. Dougherty
*Assistant Examiner*—Timothy A. Williams

[57] ABSTRACT

In the linear motor including (a) a plurality of permanent magnet members 1 fixed to a pair of ferromagnetic yokes 3 such that longitudinally adjacent magnetic poles have different polarities and that the magnetic poles of different polarities face each other via a magnetic gap 7, (b) a polyphase coil 2 disposed in the magnetic gap 7, either one of the polyphase coil 2 and the permanent magnet members 1 being caused to move relative to each other when the polyphase coil 2 is energized; and (c) a coil-supporting member 4 to which the polyphase coil 2 is fixed, the coil-supporting member 4 is made of non-magnetic ceramics having excellent heat conductivity and insulation.

9 Claims, 3 Drawing Sheets

LINEAR MOTOR

BACKGROUND OF THE INVENTION

The present invention relates to a linear motor having permanent magnet members and a polyphase coil moving relatively.

There has conventionally been a linear motor having a plurality of permanent magnet members fixed to yokes for providing a magnetic gap therebetween and a polyphase coil disposed in the magnetic gap, either one of the polyphase coil and the permanent magnet members moving relative to each other when the polyphase coil is energized. In the conventional linear motor, the polyphase coil is usually fixed to a coil base (coil-supporting member). The coil-supporting member has conventionally been made of non-magnetic materials such as epoxy resins, aluminum alloys, etc. Please refer to Japanese Patent Laid-Open No. 61-288770.

The reason why non-magnetic materials such as epoxy resins, aluminum alloys, etc. are widely used for the coil-supporting member in the conventional linear motor is to keep the thrust force of the linear motor constant by preventing magnetic attraction from being generated between the magnetic field-generating permanent magnet members with which a magnetic gap is defined and the coil-supporting member.

Particularly in the case of a linear motor having a polyphase coil-supporting member made of an epoxy resin, the resonance frequency (natural frequency) of the linear motor is likely to decrease to a practical frequency region due to a decrease in the Young's modulus, a measure of the rigidity of the coil-supporting member, resulting in the generation of mechanical vibration and noises. Also since the epoxy resin has a low heat conductivity, it is difficult to cause the heat generated from the polyphase coil by driving current to dissipate by efficient heat conduction to the coil-supporting member, thereby preventing the temperature elevation of the polyphase coil to keep the initial thrust force. This difficulty lowers the reliability of the linear motor. Accordingly, when the epoxy resin is used for the polyphase coil-supporting member, it is necessary to dispose a cooling pipe in the polyphase coil-supporting member so that a coolant flowing through the pipe removes heat generated from the polyphase coil. This makes the design of the linear motor complicated, failing to provide an inexpensive linear motor.

On the other hand, when the coil-supporting member is constituted by a plate made, of a non-magnetic metal such as aluminum alloys, etc., the coil-supporting member has a high Young's modulus and improved heat conductivity. However, since the coil-supporting member made of a non-magnetic metal is electrically conductive, eddy current is generated by the fact that the electrically conductive coil-supporting member crosses the magnetic field generated from the permanent magnet members with which a magnetic gap is defined due to the movement of the coil-supporting member relative to the permanent magnet members, resulting in a decrease in the thrust force of the linear motor. Further, as described in Japanese Patent Laid-Open No. 3-222670, the use of the non-magnetic metal plates makes the assembling of the coil-supporting member complicated, needing a lot of production steps.

OBJECT AND SUMMARY OF THE INVENTION

In view of the above problems, the object of the present invention is to provide a linear motor comprising a polyphase coil-supporting member having an extremely high resonance frequency (natural frequency) and such a high heat conductivity that heat generated from the polyphase coil is efficiently conducted to the coil-supporting member to suppress the temperature elevation of the polyphase coil, thereby preventing a decrease in the thrust force. A further object of the present invention is to provide a linear motor in which eddy current adversely affecting the thrust force is not generated.

In the first embodiment for achieving the above objects, the linear motor comprises a plurality of permanent magnet members with which a magnetic gap is defined; a polyphase coil disposed in the magnetic gap, either one of the polyphase coil and the permanent magnet members being caused to move relative to each other when the polyphase coil is energized; and a coil-supporting member to which the polyphase coil is fixed, the coil-supporting member being made of non-magnetic ceramics having excellent heat conductivity and insulation.

In the second embodiment for achieving the above objects, the linear motor comprises (a) a plurality of permanent magnet members fixed to a pair of ferromagnetic yokes such that longitudinally adjacent magnetic poles have different polarities and that the magnetic poles of different polarities face each other via a magnetic gap, (b) a polyphase coil disposed in the magnetic gap, either one of the polyphase coil and the permanent magnet members being caused to move relative to each other when the polyphase coil is energized; and (c) a coil-supporting member to which the polyphase coil is fixed, the coil-supporting member being made of non-magnetic ceramics having excellent heat conductivity and insulation.

In the third embodiment for achieving the above objects, the movable coil linear motor comprises (a) a plurality of permanent magnet members fixed to a pair of stationary ferromagnetic yokes such that longitudinally adjacent magnetic poles have different polarities and that the magnetic poles of different polarities face each other via a magnetic gap; (b) a polyphase coil disposed in the magnetic gap such that the polyphase coil is longitudinally movable along the permanent magnet members; (c) a coil-supporting member to which the polyphase coil is fixed, the coil-supporting member being made of heat-conductive, insulating, non-magnetic ceramics having a resistivity of $10^1 \Omega \cdot cm$ or more, a heat conductivity of 1 W/m·K or more and a Young's modulus of $0.5 \times 10^4$ $kgf/mm^2$ or more; and (d) a driving circuit for supplying sinusoidal current to the polyphase coil.

In the fourth embodiment for achieving the above objects, the movable magnet linear motor comprises (a) a plurality of permanent magnet members fixed to a pair of movable ferromagnetic yokes such that longitudinally adjacent magnetic poles have different polarities and that the magnetic poles of different polarities face each other via a magnetic gap; (b) a polyphase coil stationarily disposed in the magnetic gap; (c) a coil-supporting member to which the polyphase coil is fixed, the coil-supporting member being made of heat-conductive, insulating, non-magnetic ceramics having a resistivity of $10^1 \Omega \cdot cm$ or more, a heat conductivity of 1 W/m·K or more and a Young's modulus of $0.5 \times 10^4$ $kgf/mm^2$ or more; and (d) a driving circuit for supplying sinusoidal current to the polyphase coil.

DETAILED DESCRIPTION OF THE PREFERRED EMBODIMENTS

[1] Materials of Each Member
(a) Permanent magnet members

The permanent magnet members may be produced by known methods such as a sintering method, a casting method, a rapid quenching method, a resin bonding method, etc. The permanent magnet members may preferably be made of one or more of rare earth magnets, ferrite magnets, Alnico magnets, Mn—Al—C magnets, Mn—Al magnets, etc. The rare earth magnets may have basic compositions represented by the general formulae: R—Fe—B, $SmCo_5$, $Sm_2Co_{17}$, Sm—Fe—N, wherein R is one or more rare earth elements such as Nd, Dy, etc. including Y). The rare earth magnets may contain one or more magnetic properties-improving elements such as Co, Al, Nb, Ga, Gd, Fe, Cu, Zr, Ti, Hf, Ni, Si, etc. and one or more inevitable impurities such as O, C, H, N, etc. Among them, anisotropic sintered magnets and resin-bonded magnets of Nd—Fe—B are particularly preferable. Though isotropic magnets may be used, anisotropic magnets having high energy products are more preferred.

With respect to the Nd—Fe—B permanent magnets, their vulnerability to oxidation makes it necessary to form an oxidation-resistant layer such as Ni plating, etc. having an average thickness of about 2–100 μm on surfaces of the Nd—Fe—B permanent magnets.

(b) Ferromagnetic yoke

The ferromagnetic yoke may be produced from one or more known ferromagnetic materials such as pure iron, soft iron, carbon steel (for instance, SS41, SS400, S45C, etc.), ferritic or martensitic magnetic stainless steel, cast iron or cast steel, soft ferrite such as Mn—Zn ferrite, Fe—Ni alloys such as Permalloy, Fe—Ni—Co alloys such as Koval. These ferromagnetic materials may be used in the form of powder and mixed with thermoplastic or thermosetting resins. Among them, carbon steel is particularly preferable, because it has a high magnetic flux density and is inexpensive.

(a) Coil-supporting member

The coil-supporting member of the present invention may preferably be made of non-magnetic ceramics having a resistivity of $10^1 \Omega \cdot cm$ or more at 25° C. and DC, a heat conductivity of 1 W/m·K or more at 25° C. and a Young's modulus of $0.5 \times 10^4$ kgf/mm² or more at 25° C. Here, taking into consideration a practical temperature range (0°–100° C.) of the linear motor, 25° C. is a reasonable temperature at which the temperature distribution, resonance frequency and eddy current suppression are measured. Thus, the resistivity, the heat conductivity and the Young's modulus described herein are valued measured at 25° C. unless otherwise mentioned.

The non-magnetic ceramics preferably have a resistivity of $10^1 \Omega \cdot cm$ or more, because if otherwise, eddy current generated in the coil-supporting member would reduce the thrust force of the linear motor. The heat conductivity of the non-magnetic ceramics is preferably 1 W/m·K or more. If otherwise, heat generated from the polyphase coil by driving current would not be efficiently conducted to the coil-supporting member, whereby the polyphase coil would be locally heated to a high temperature, causing Joule's heat loss. This in turn would reduce the effective current supplied to the polyphase coil, resulting in a decrease in the thrust force of the linear motor. The non-magnetic ceramics preferably have a Young's modulus of $0.5 \times 10^4$ kgf/mm² or more, because if otherwise, the coil-supporting member would have a decreased resonance frequency, generating mechanical vibration and noises during the continuous operation of the linear motor.

More preferably, the non-magnetic ceramics have a resistivity of $10^1 \Omega \cdot cm$ or more, a heat conductivity of 10 W/m·K or more and a Young's modulus of $1.0 \times 10^4$ kgf/mm² or more.

The non-magnetic ceramics preferably have a dielectric breakdown voltage of 1 kV/mm or more when measured on a 1-mm-thick sample at 25° C. and AC.

The non-magnetic ceramics may be nitrides such as BN (preferably hexagonal boron nitride), AlN, TiN, $Si_3N_4$, SIALON, etc., oxides such as $B_2O_3$, MgO, MnO, $Al_2O_3$, $SiO_2$, ZnO, $TiO_2$, $ZrO_2$, $SnO_2$, $CeO_2$, BaO, BeO, CaO, $K_2O$, etc., carbides such as SiC, TiC, ZrC, TaC, $B_4C$, WC, $W_2C$, silicates such as $2MgO.SiO_2$, $MgO.SiO_2$, $CaO.SiO_2$, $ZrO_2.SiO_2$, $3Al_2O_3.2SiO_2$, $2MgO.2Al_2O_3.5SiO_2$, $Li_2O.Al_2O_3.4SiO_2$, composite oxides such as $Al_2TiO_5$, $MgAl_2O_4$, $Ca_{10}(PO_4)_6(OH)_2$, $BaTiO_3$, $Pb(Zr,Ti)O_3$, $(Pb,La)(Zr,Ti)O_3$, $LiNbO_3$, composite sintered ceramics of AlN and BN, etc. alone or in combination. Among these non-magnetic ceramics, composite sintered ceramics of AlN and BN, AlN, $Al_2O_3$, BN (particularly hexagonal boron nitride) are preferable, and the composite sintered ceramics of AlN and BN are particularly preferable.

The AlN/BN composite sintered ceramics may preferably comprise 50–97 weight % of aluminum nitride and 3–50 weight % of boron nitride. The AlN/BN composite sintered ceramics may also contain 0.01–10 parts by weight, per 100 parts by weight of aluminum nitride+boron nitride, of at least one compound of a metal selected from the groups Ia and IIIa of the Periodic Table. More preferably, aluminum nitride is 65–95 weight %, boron nitride is 5–35 weight %, and at least one compound of the Ia or IIIa metal is 0.05–5 parts by weight per 100 parts by weight of aluminum nitride+boron nitride.

The metals in the group IIa of the Periodic Table are preferably Be, Ca, Sr, Ba, etc., and the metals in the group IIIa of the Periodic Table are preferably Y and lanthanide elements, specifically Y, La, Ce, Pr, Nd, Pm, Sm, Eu, Gd, Tb, Dy, Ho, Er, Tm, Yb, Lu, etc., particularly preferably Y, La, Ce, Nd, etc. The compounds of metals in the groups IIa and IIIa of the Periodic Table may be used as sintering aids for aluminum nitride powder and/or boron nitride powder. Generally, these compounds are used preferably in the form of nitrates, carbonates, chlorides, oxides, etc. When the above compounds are used in the form of nitrates, they are converted to nitrites by heating in an oxygen-containing atmosphere. On the other hand, the carbonates and chlorides are converted to oxides.

During the operation, the linear motor can have a low and uniform temperature distribution meeting the following relation:

$$T_H - T_L < 40° C.,$$

wherein $T_H$ is a highest surface temperature of the polyphase coil, and $T_L$ is a lowest surface temperature of the coil-supporting member. If the temperature difference $(T_H - T_L)$ exceeds 40° C., the heat generated from the polyphase coil reduces the thrust force of the linear motor and softens the adhered portion of the polyphase coil and the coil-supporting member, causing the displacement of the polyphase coil and the local detachment of an adhesive layer, etc. The temperature difference ($T_H$–$T_L$) is preferably 30° C. or lower, and more preferably 20° C. or lower.

Higher Young's modulus can be achieved by fixing the polyphase coil to the coil-supporting member made of heat-conductive, high-insulation, non-magnetic ceramics than by fixing the polyphase coil to a coil-supporting member made of epoxy resins or aluminum alloys. Higher Young's modulus makes the resonance frequency of the linear motor largely exceed a practical frequency range of the linear motor, thereby preventing the mechanical vibration of the linear motor during operation. Also, since the coil-supporting member made of the non-magnetic ceramics has a sufficiently high heat conductivity, heat generated from the polyphase coil by driving current is effectively conducted to the coil-supporting member and to the other members such as supports. Thus, in the case of the heat-releasing linear motor, the polyphase coil is not locally heated even during the continuous operation, making it unnecessary to cool the linear motor by a proper means. As a result, the linear motor is provided with a low and narrow temperature distribution, suppressing a decrease in the thrust force of the linear motor with time.

Further, since the coil-supporting member made of non-magnetic ceramics according to the present invention has a higher resistivity than that of non-magnetic metals such as aluminum alloys, etc., only the slightest eddy current is generated in the coil-supporting member when the coil-supporting member crosses the magnetic flux due to the relative movement of the coil-supporting member to the magnetic field-generating permanent magnet members, thereby making it possible to suppress the thrust force of the linear motor.

[2] Structure of Linear Motor (a) First embodiment

Figure 1:
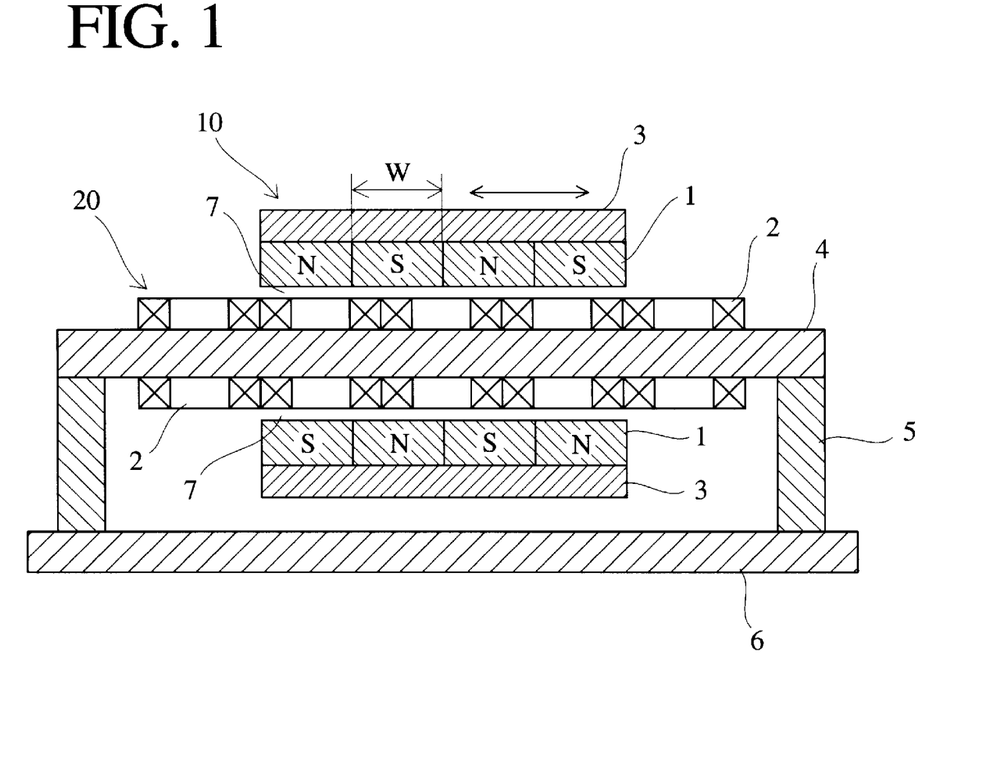
FIG. 1 is a cross-sectional view showing a linear motor according to one embodiment of the present invention.

FIG. 1 shows a movable magnet linear motor according to one embodiment of the present invention. A plurality of magnetic field-generating permanent magnet members 1 are fixed to a pair of ferromagnetic yokes 3 by an epoxy adhesive to define a magnetic gap 7 therebetween. The permanent magnet members 1 are arranged such that they have magnetic poles of alternatingly different polarities in the longitudinal direction, and that their magnetic poles of different polarities face each other via the magnetic gap 7. A movable member 10 is constituted by the permanent magnet members 1 and the ferromagnetic yokes 3 in the linear motor shown in FIG. 1. The permanent magnet members 1 and the ferromagnetic yokes 3 are movable in parallel with a paper surface of FIG. 1.

Disposed in the magnetic gap 7 defined by the pair of opposing sets of the permanent magnet members 1 is a stator 20 constituted by a polyphase coil 2 and a coil-supporting member 4. The coil-supporting member 4 is fixed to a non-magnetic base 6 via non-magnetic supports 5.

Fixed to the coil-supporting member 4 is the polyphase coil 2 consisting of a plurality of coils, to each of which current (usually three-phase sinusoidal current) is supplied from a driving circuit (not shown). By changing the current supplied to each coil of the polyphase coil 2, the movable member 10 consisting of permanent magnet members 1 and ferromagnetic yokes 3 is subjected to a certain thrust force, whereby the movable member 10 moves in the magnetic gap 7 longitudinally along the permanent magnet members 1.

Changing of the driving current supplied to the polyphase coil 2 may be conducted based on a detection signal of a magnetic detection element such as a Hall element (not shown). Thus, the ferromagnetic yokes 3 to which the permanent magnet members 1 are fixed are movable in the linear motor according to the first embodiment.

Figure 2:
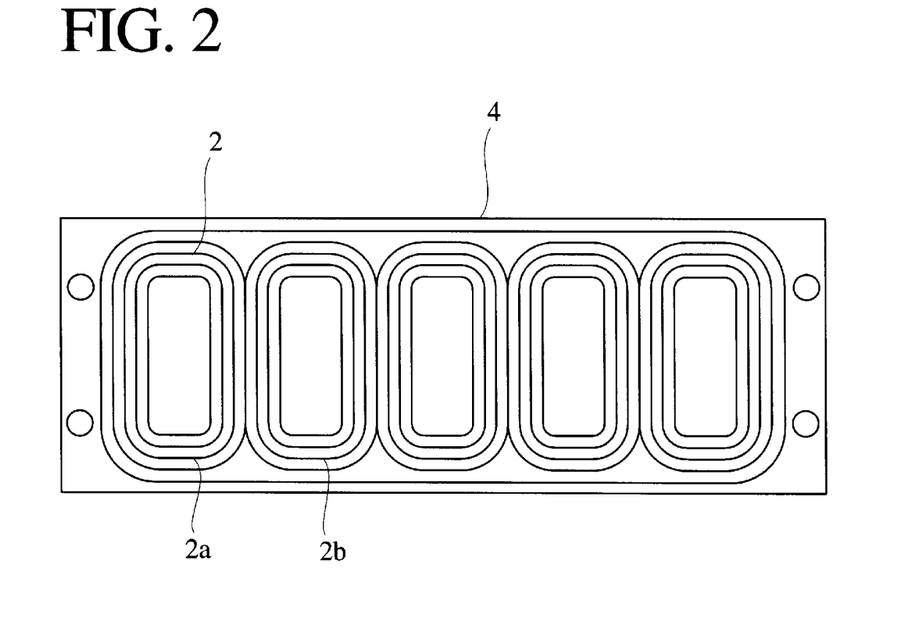
FIG. 2 is a plan view showing the construction of the polyphase coil and the coil-supporting member according to the present invention.

FIG. 2 shows how the polyphase coil 2 is constituted and fixed to the coil-supporting member 4. The polyphase coil 2 is constituted by a plurality of small coils 2a, 2b . . . , and each coil 2a, 2b . . . is formed by winding an insulator-coated copper alloy wire. Each small coil 2a, 2b . . . of the polyphase coil 2 is fixed to a surface of the coil-supporting member 4 by an epoxy adhesive such as a mixture of AV138 and HV998, etc.

The purpose of using the non-magnetic ceramics for the coil-supporting member 4 is to prevent the generation of thrust force ripple. If the coil-supporting member 4 is made of a magnetic material, balance is tipped toward the coil-supporting member 4 due to a magnetic attraction of the permanent magnet members 1, thereby causing a thrust force ripple.

(b) Second embodiment

Figure 3:
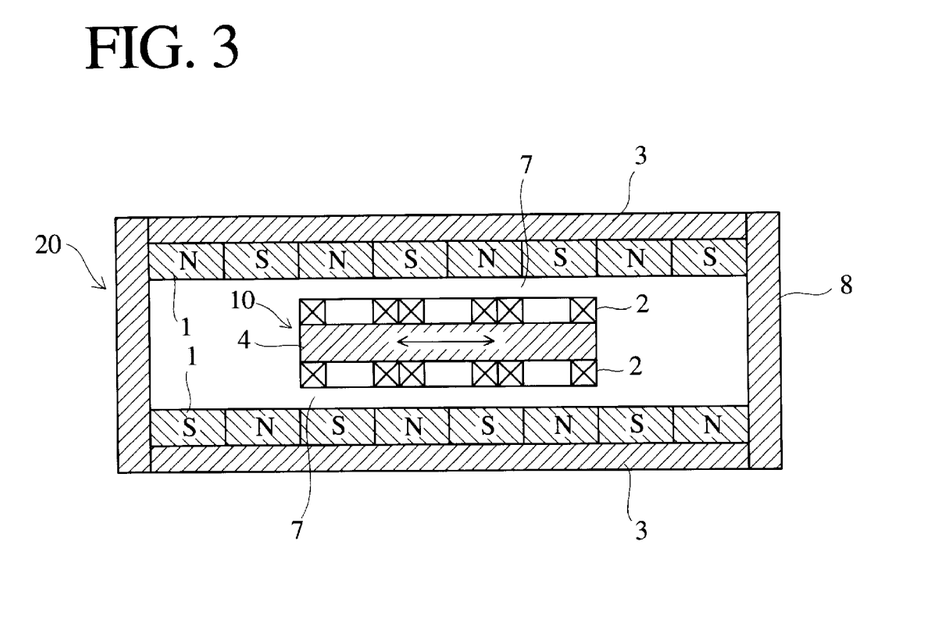
FIG. 3 is a cross-sectional view showing a linear motor according to another embodiment of the present invention.

FIG. 3 shows a movable coil linear motor according to another embodiment of the present invention. The same reference numerals as in FIG. 1 are used in FIG. 3 to denote the same or corresponding members.

In FIG. 3, a plurality of permanent magnet members 1 are fixed to a pair of ferromagnetic yokes 3 (for instance made of SS400) opposing each other via a magnetic gap 7 to form a stator 20. Both ends of the ferromagnetic yokes 3 are supported by support members 8. Movably disposed in the magnetic gap 7 along the permanent magnet members 1 is a movable member 10 constituted by a polyphase coil 2 fixed to a coil-supporting member 4 by an epoxy adhesive. The coil-supporting member 4 may be made of composite sintered ceramics comprising AlN, BN and inevitable impurities.

The linear motor as shown in FIG. 3 comprises a coil-supporting member 4 having excellent rigidity, generating no mechanical vibration. Also, by efficient heat conduction from the polyphase coil 2 to the coil-supporting member 4, the temperature elevation of the polyphase coil 2 is effectively prevented, and eddy current affecting the thrust force of the linear motor is not generated.

(c) Third embodiment

Figure 4:
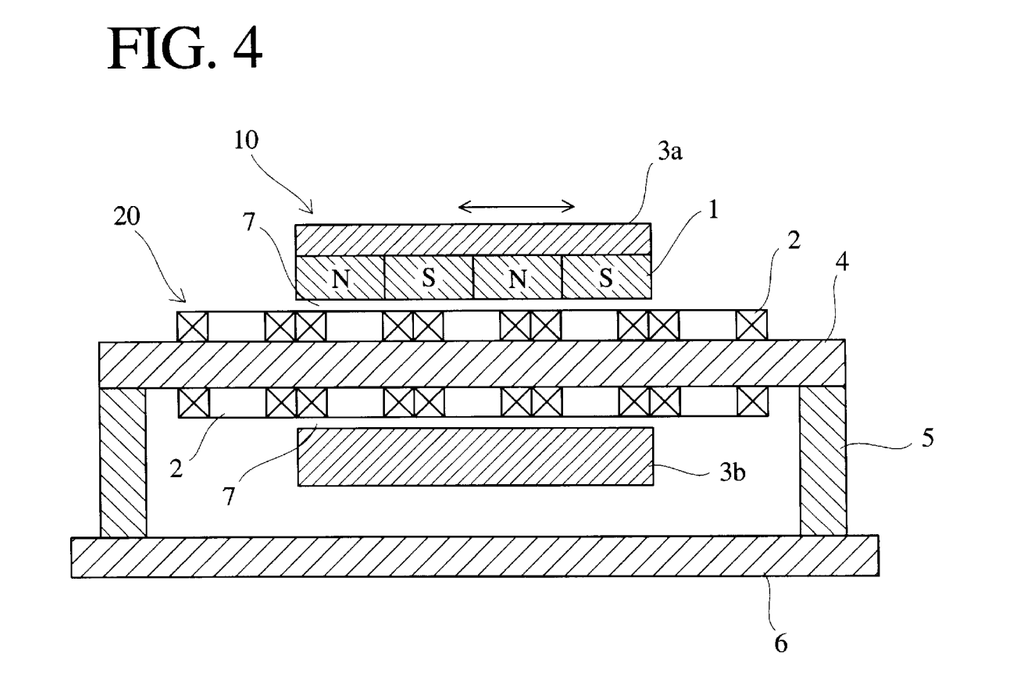
FIG. 4 is a cross-sectional view showing a linear motor according to a further embodiment of the present invention.

FIG. 4 shows a movable magnet linear motor according to a further embodiment of the present invention. The same reference numerals as in FIG. 1 are used in FIG. 4 to denote the same or corresponding members.

In this embodiment, a plurality of permanent magnet members 1 are fixed to one ferromagnetic yoke 3a (for instance, SS41) such that longitudinally adjacent magnetic poles have different polarities, and the ferromagnetic yoke 3a provided with the permanent magnet members 1 opposes the other ferromagnetic yoke 3b (for instance, SS41) via a magnetic gap 7 to constitute a movable member 10. The ferromagnetic yokes 3a, 3b are connected to each other to form an integral ferromagnetic yoke by a hold member (not shown). With respect to the function of the coil-supporting member 4, the movable magnet linear motor of FIG. 4 is the same as that of FIG. 1.

(d) Fourth embodiment

Figure 5:
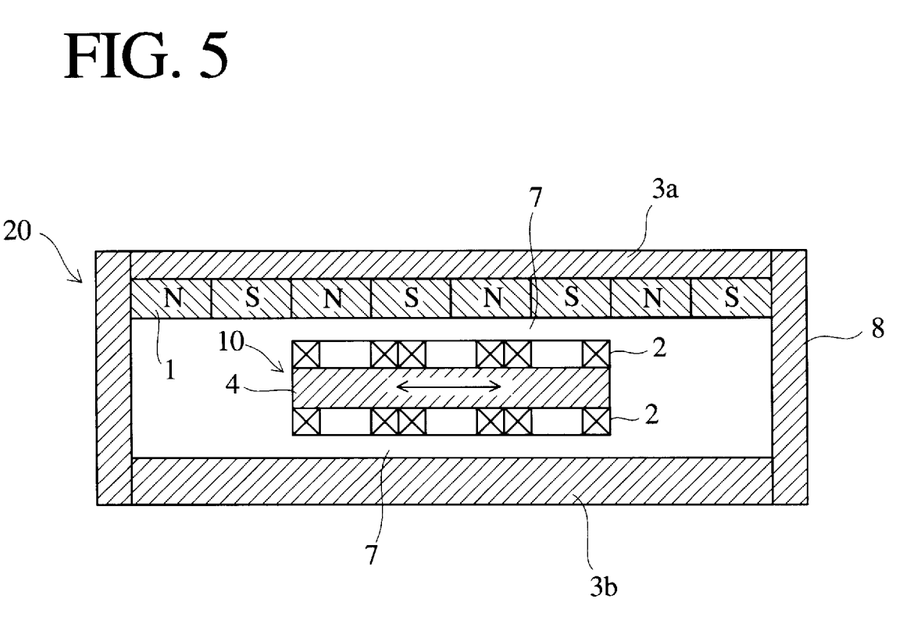
FIG. 5 is a cross-sectional view showing a linear motor according to a still further embodiment of the present invention.

FIG. 5 shows a movable coil linear motor according to a still further embodiment of the present invention. The same reference numerals as in FIG. 3 are used in FIG. 5 to denote the same or corresponding members.

In this embodiment, a plurality of permanent magnet members 1 are fixed to one ferromagnetic yoke 3a (for instance, SS41) such that longitudinally adjacent magnetic poles have different polarities, and the ferromagnetic yoke 3a provided with the permanent magnet members 1 opposes the other ferromagnetic yoke 3b (for instance, SS41) via a magnetic gap 7 to constitute a stator 20. With respect to the function of the coil-supporting member 4, the movable coil linear motor of FIG. 5 is the same as that of FIG. 3.

The present invention will be explained in further detail by way of the following Examples without intention of restricting the scope of the present invention thereto.

EXAMPLE 1, COMPARATIVE EXAMPLES 1 AND 2

An linear motor shown in FIG. 1 was assembled from a pair of ferromagnetic yokes 3 made of SS41 using an epoxy adhesive (Araldite AV138, etc.) and a coil-supporting member 4 fixed to a base 6 made of SUS304 via supports 5 made of SUS304. The coil-supporting member 4 was made of composite sintered ceramics ("Shapal Msoft" available from Tokuyama K. K. ) comprising 80 weight % of AlN, 20 weight % of BN, and 8.4 parts by weight, per 100 parts by weight of AlN+BN, of calcium nitrate tetrahydrate. This composite sintered ceramic further contained 450 ppm of Ca, 60 ppm of Cr, 15 ppm of Mg, less than 5 ppm of Ni, 20 ppm of Fe, less than 15 ppm of Si, 0.5 weight % of O as inevitable impurities.

The permanent magnet members 1 were made of an anisotropic sintered magnet of Nd—Fe—B ("HS-37BH" available from Hitachi Metals, Ltd.), and provided with a three-layer oxidation-resistant coating consisting of a Cu plating layer having an average thickness of 5 $\mu$m, a Ni plating layer having an average thickness of 50 $\mu$m and an epoxy electrodeposition layer having an average thickness of 30 $\mu$m in this order.

As shown in FIG. 2, a polyphase coil 2 formed by winding an insulator-coated copper alloy wire was fixed to a surface of the coil-supporting member 4 by an epoxy adhesive (mixture of AV138 and HV998). Table 1 shows the properties of the above non-magnetic ceramics ("Shapal Msoft") as Example 1, and an epoxy resin (Comparative Example 1) and an aluminum alloy (Comparative Example 2) conventionally used for the coil-supporting member 4.

TABLE 1

| Properties | Example 1 Shapal Msoft* | Com. Ex. 1 Epoxy Resin | Com. Ex. 2 Aluminum |
|---|---|---|---|
| Density (g/cm$^3$) | 2.9 | 2.0 | 2.7 |
| Resistivity ($\Omega \cdot$ cm) | $1.5 \times 10^{12}$ | $1.1 \times 10^{14}$ | $2.8 \times 10^{-8}$ |
| Dielectric Breakdown Voltage (kV/mm) | 40 | 40 | — |
| Heat Conductivity (W/m · K) | 90 | 0.2 | 200 |
| Young's Modulus (kgf/mm$^2$) | 19,000 | 1,500 | 7,000 |

Note *Composite sintered ceramic of AlN and BN.

It is clear from Table 1 that by forming the coil-supporting member 4 from non-magnetic ceramics (Shapal Msoft) the coil-supporting member 4 is provided with an improved Young's modulus, thereby making it possible to shift the resonance frequency of the linear motor toward a higher frequency than the operating frequency of the linear motor, leading to suppression of mechanical vibration, etc. of the linear motor during operation. On the other hand, when the coil-supporting member 4 is formed from an epoxy resin, the Young's modulus of the coil-supporting member 4 is less than one-tenth of Shapal Msoft as shown in Table 1, whereby mechanical vibration, etc. of the linear motor are not likely to be suppressed during operation. Thus, the use of Shapal Msoft increases the resonance frequency of the coil-supporting member 4 to as high as three times that of the epoxy resin. Here, the resonance frequency (natural frequency) is proportional to a square root of the Young's modulus.

In a case where an aluminum alloy is used (Comparative Example 2), the Young's modulus of the coil-supporting member 4 is about one-third of Shapal Msoft as shown in Table 1, resulting in a decrease in a resonance frequency.

As shown in Table 1, with respect to a heat conductivity the non-magnetic ceramics (Shapal Msoft) of Example 1 is higher than an epoxy resin (Comparative Example 1) and substantially equal to an aluminum alloy (Comparative Example 2). Accordingly, heat generated from the polyphase coil due to the driving current is more easily conducted to the overall coil-supporting member and further to other members connected to the coil-supporting member 4 when the coil-supporting member 4 is made of the non-magnetic ceramics than when it is made of an epoxy resin or an aluminum alloy. Thus the temperature elevation of the polyphase coil is minimized in the case of the non-magnetic ceramics.

As shown in Table 1, since the non-magnetic ceramic (Shapal Msoft) of Example 1 has a higher resistivity than the aluminum alloy of Comparative Example 2, the coil-supporting member 4 made of the non-magnetic ceramics is advantageous over that of the aluminum alloy in that a smaller eddy current is generated in the non-magnetic ceramics than in the aluminum alloy when the coil-supporting member 4 crosses magnetic fluxes by the relative movement of the magnetic field-generating permanent magnet members.

Next, after operating the linear motor shown in FIG. 1 (having a coil-supporting member 4 made of Shapal Msoft) by continuously supplying a three-phase sinusoidal driving current to the polyphase coil 2 for 10 hours, the linear motor was stopped to measure the highest surface temperature ($T_H$) of the polyphase coil 2 and the lowest surface temperature ($T_L$) of the coil-supporting member 4 at an atmospheric temperature of 25° C. As a result, it was found that the linear motor had a good temperature distribution, which was $\Delta T$ ($T_H$–$T_L$) of 2° C. and $T_L$ of 26° C.

When the coil-supporting member 4 made of the non-magnetic ceramics was assembled into the linear motor to achieve a good temperature distribution, no trouble was found in an adhesion boundary between the polyphase coil 2 and the coil-supporting member 4. On the other hand, when the coil-supporting member 4 was made of the epoxy resin (Comparative Example 1), a large unevenness took place in a temperature distribution ($\Delta T=95°$ C. and $T_L$ was 30° C.), and heat generated from the polyphase coil 2 was not easily conducted to the coil-supporting member 4, thereby failing to achieve an even temperature distribution, and resulting in softening of the adhesion boundary between the locally heated polyphase coil 2 and the coil-supporting member 4 to some extent. As a result, the polyphase coil 2 was likely to be displaced from the coil-supporting member 4 when strongly pushed with a finger.

Though the coil-supporting member made of Shapal Msoft (composite sintered ceramic of AlN and BN) was used in this Example, it should be noted that any other non-magnetic ceramics may be used in the present invention as long as the non-magnetic ceramics have a resistivity of $10^1 \Omega \cdot$cm or more, a heat conductivity of 1 W/m·K or more and a Young's modulus of $0.5 \times 10^4$ kgf/mm$^2$ or more.

EXAMPLES 2–4

A movable coil linear motor shown in FIG. 3 was assembled by fixing a plurality of permanent magnet members 1 to a pair of ferromagnetic yokes 3 made of SS400. Movably disposed in the magnetic gap 7 along the permanent magnet members 1 was a movable member 10 constituted by a polyphase coil 2 fixed to the coil-supporting member 4 made of composite sintered ceramics (Shapal Msoft comprising 65 weight % of AlN, 35 weight % of BN and the same amounts of inevitable impurities as in Example 1) by an epoxy adhesive (mixture of AV138 and HV998). The non-magnetic ceramics in Example 2 had a density of 2.8 g/cm$^3$, a resistivity of 2.6×10$^{12}$ Ω·cm, a heat conductivity of 75 W/m·K and a Young's modulus of 18,000 kgf/mm$^2$.

Since the linear motor of Example 2 comprised a coil-supporting member 4 having excellent rigidity, no mechanical vibration was generated. Also, by efficient heat conduction, the temperature elevation of the polyphase coil 2 was prevented, and eddy current affecting the thrust force of the linear motor was not generated.

The linear motor of FIG. 3 comprising the coil-supporting member 4 of Example 2 was continuously operated under the same conditions as in Example 1 to measure the highest surface temperature ($T_H$) of the polyphase coil 2 and the lowest surface temperature ($T_L$) of the coil-supporting member 4. As a result, it was found that the linear motor had a good temperature distribution, which was $\Delta T$ (=$T_H$-$T_L$) of 3° C. and $T_L$ of 26° C. It was found that the polyphase coil 2 was strongly adhered to the coil-supporting member 4.

The AlN/BN composite sintered ceramic of Example 2 was compared with other non-magnetic ceramics (AlN in Example 3, and α-Al$_2$O$_3$ in Example 4), with respect to various properties. The results are shown in Table 2.

TABLE 2

| Properties | Example 2 Shapal Msoft* | Example 3 AlN | Example 4 α-Al$_2$O$_3$ |
| --- | --- | --- | --- |
| Density (g/cm$^3$) | 2.8 | 3.25 | 3.75 |
| Resistivity (Ω · cm) | 2.6 × 10$^{12}$ | 2.8 × 10$^{12}$ | 1.7 × 10$^{14}$ |
| Dielectric Breakdown Voltage (kV/mm) | 40 | 10 | 15 |
| Heat Conductivity (W/m · K) | 75 | 150 | 20 |
| Young's Modulus (kgf/mm$^2$) | 18,000 | 31,620 | 35,700 |

Note *Composite sintered ceramic of AlN and BN.

A coil-supporting member 4 was formed from AlN of Example 3 and the epoxy resin of Comparative Example 1, 5 respectively and assembled into the linear motor shown FIG. 1 to measure $\Delta T$ (°C.) under the same conditions as in Example 1. Also, a coil-supporting member 4 was formed from α-Al$_2$O$_3$ of Example 4 and the aluminum alloy of Comparative Examples 2, respectively and assembled into the linear motor shown FIG. 3 to measure $\Delta T$ (°C.) under the same conditions as in Example 2. The results are shown in Table 3.

It is clear from Table 3 that when the non-magnetic ceramics forming the coil-supporting member 4 has a resistivity of 10$^1$ Ω·cm or more, a heat conductivity of 1 W/m·K or more and a Young's modulus of 0.5×10$^4$ kgf/mm$^2$ or more, excellent heat conduction ($\Delta T$<20° C.) can be achieved even during continuous operation.

Immediately before the measurement of $\Delta T$ (°C.), namely during continuous supply of a three-phase sinusoidal drive current to the polyphase coil 2 for 10 hours, the thrust force of the linear motor was measured. As shown in Table 3, the thrust force of the linear motor dropped from the initial level only slightly in Examples 1–4, while it dropped drastically in Comparative Examples 1 and 2. Thus, it is clear that the use of the non-magnetic ceramics of the present invention for the coil-supporting member makes it possible to minimize the decrease in the thrust force of the linear motor.

TABLE 3

| No. | $\Delta T$ (°C.) | Change of Thrust Force (%)[1] |
| --- | --- | --- |
| Example 1 | 2 | 95 |
| Example 2 | 3 | 94 |
| Example 3 | 1 | 96 |
| Example 4 | 10 | 92 |
| Com. Ex. 1 | 95 | 71 |
| Com. Ex. 2 | 1 | 64 |

Note (1) Values relative to the initial thrust force.

Though the present invention has been explained referring to the above embodiments and Examples, it should be noted that any modifications may be applied unless they deviate from the scope of the present invention defined by the claims attached hereto.

For instance, with respect to the longitudinal arrangement of the permanent magnet members 1, a gap "h" may be provided between the longitudinally adjacent permanent magnet members 1 attached to a pair of ferromagnetic yokes 3 in the linear motor of FIG. 1. In this case, the gap "h" is preferably determined to meet 0<h≦W, wherein W represents the longitudinal length of each permanent magnet member 1. Also, in the linear motor of FIG. 3, the permanent magnet members 1 fixed to a pair of ferromagnetic yokes 3 for providing a magnetic gap 7 therebetween may be arranged such that there is provided a gap "h" between the longitudinally adjacent permanent magnet members 1.

The driving current supplied to the polyphase coil 2 may be a three-phase sinusoidal current or a two-phase sinusoidal current depending on the desired thrust force pattern.

Though there are a plurality of permanent magnet members 1 fixed to the ferromagnetic yokes 3 in the above embodiments, a long permanent magnet member provided with a plurality of magnetic poles having alternately different polarities in the longitudinal direction may be used.

Also, instead of the ferromagnetic yokes 3, 3a, 3b, non-magnetic yokes made of SUS304, etc. may be used.

The coil-supporting member 4 of the present invention may be an integral body of the non-magnetic ceramics or constituted by separate bodies of the non-magnetic ceramics adhered by a known adhesive such as an epoxy adhesive (mixture of AV138 and HV998), depending on the workability of the non-magnetic ceramics.

As described in detail above, since the coil-supporting member can be provided with an extremely high resonance frequency in the present invention, it is possible to minimize the mechanical vibration of the linear motor. In addition, since heat generated from the polyphase coil is easily conducted to the coil-supporting member and further to other members connected thereto, it is possible to suppress the temperature elevation of the polyphase coil. Further, eddy current adversely affecting the thrust force of the linear motor is not generated. Therefore, the linear motor of the present invention is highly reliable and can be produced at low cost.

What is claimed is:

1. A linear motor comprising:
   a plurality of permanent magnet members defining a magnetic gap on one side thereof;

a polyphase coil disposed in said magnetic gap, one of said polyphase coil and said permanent magnet members being caused to move relative to the other when said polyphase coil is energized; and a coil-supporting member to which said polyphase coil is fixed, said coil-supporting member being made of a non-magnetic, heat conducting and electrically insulating ceramic selected from the group consisting of aluminum nitride and a composite sintered ceramic comprising 50–97 weight % of aluminum nitride and 3–50 weight % of boron nitride.

2. The linear motor according to claim 1, wherein said ceramic has a resistivity of $10^1 \Omega \cdot cm$ or more, a heat conductivity of 1 W/m·K or more and a Young's modulus of $0.5 \times 10^4$ kgf/mm$^2$ or more.

3. A linear motor comprising:

(a) a pair of ferromagnetic yokes;

(b) a plurality of permanent magnet members fixed to each of said pair of ferromagnetic yokes such that longitudinally adjacent magnetic members have different polarities, the pair of ferromagnetic yokes each having the plurality of permanent magnet members fixed thereto being arranged to oppose one another with a magnetic gap therebetween such that permanent magnet members having different polarities face each other across the magnetic gap;

(c) a polyphase coil disposed in said magnetic gap, one of said polyphase coil and said permanent magnet members being caused to move relative to the other when said polyphase coil is energized; and (d) a coil-supporting member to which said polyphase coil is fixed, said coil-supporting member being made of a non-magnetic, heat conducting and electrically insulating ceramic selected from the group consisting of aluminum nitride and a composite sintered ceramic comprising 50–97 weight % of aluminum nitride and 3–50 weight % of boron nitride.

4. The linear motor according to claim 1, wherein said coil-supporting member provides a temperature distribution such that a difference between $T_H$ and $T_L$ is less than or equal to 40 degrees Celsius, where $T_H$ is the highest surface temperature of the polyphase coil and $T_L$ is the lowest surface temperature of the coil supporting member.

5. The linear motor according to claim 3, wherein said coil-supporting member provides a temperature distribution such that a difference between $T_H$ and $T_L$ is less than or equal to 40 degrees Celsius, where $T_H$ is the highest surface temperature of the polyphase coil and $T_L$ is the lowest surface temperature of the coil supporting member.

6. A linear motor comprising:

(a) a pair of stationary ferromagnetic yokes;

(b) a plurality of permanent magnet members fixed to each of said pair of stationary ferromagnetic yokes such that longitudinally adjacent magnetic members have different polarities, the pair of ferromagnetic yokes each having the plurality of permanent magnet members fixed thereto being arranged to oppose one another with a magnetic gap therebetween such that permanent magnet members having different polarities face each other via across the magnetic gap;

(c) a polyphase coil disposed in said magnetic gap such that said polyphase coil is longitudinally movable with respect to said permanent magnet members;

(d) a coil-supporting member to which said polyphase coil is fixed, said coil-supporting member being made of a non-magnetic heat conducting and electrically insulating ceramic selected from the group consisting of aluminum nitride and a composite sintered ceramic comprising 50–97 weight % of aluminum nitride and 3–50 weight % of boron nitride; and (e) a driving circuit for supplying sinusoidal current to said polyphase coil to longitudinally move the polyphase coil with respect to the permanent magnetic members.

7. A linear motor comprising:

(a) a pair of movable ferromagnetic yokes;

(b) a plurality of permanent magnet members fixed to each of said pair of movable ferromagnetic yokes such that longitudinally adjacent magnetic members have different polarities, the pair of ferromagnetic yokes each having the plurality of permanent magnet members fixed thereto being arranged to oppose one another with a magnetic gap therebetween such that permanent magnet members having different polarities face each other via across the magnetic gap;

(c) a polyphase coil stationarily disposed in said magnetic gap such that said permanent magnetic members are longitudinally movable with respect to said polyphase coil;

(d) a coil-supporting member to which said polyphase coil is fixed, said coil-supporting member being made of a non-magnetic, heat conducting and electrically insulating ceramic selected from the group consisting of aluminum nitride and a composite sintered ceramic comprising 50–97 weight % of aluminum nitride and 3–50 weight % of boron nitride; and (e) a driving circuit for supplying sinusoidal current to said polyphase coil to longitudinally move the polyphase coil with respect to the permanent magnetic members.

8. The linear motor according to claim 6, wherein said coil-supporting member provides a temperature distribution such that a difference between $T_H$ and $T_L$ is less than or equal to 40 degrees Celsius, where $T_H$ is the highest surface temperature of the polyphase coil and $T_L$ is the lowest surface temperature of the coil supporting member.

9. The linear motor according to claim 8, wherein said coil-supporting member provides a temperature distribution such that a difference between $T_H$ and $T_L$ is less than or equal to 40 degrees Celsius, where $T_H$ is the highest surface temperature of the polyphase coil and $T_L$ is the lowest surface temperature of the coil supporting member.

\* \* \* \* \*

UNITED STATES PATENT AND TRADEMARK OFFICE
CERTIFICATE OF CORRECTION

PATENT NO.: 5,808,381
DATED : September 15, 1998
INVENTOR(S): Hiroyuki AOYAMA, et al.

It is certified that error appears in the above-identified patent and that said Letters Patent is hereby corrected as shown below:

Col. 4,   line 39, change "Ia" to --IIa--;
          line 42, change "Ia" to --IIa--.

Col. 9,   line 49, delete "5".

Signed and Sealed this

Sixteenth Day of February, 1999

Attest:

Attesting Officer

*Acting Commissioner of Patents and Trademarks*